Sept. 20, 1960

C. M. KLINE 2,953,360

MIXER

Filed Sept. 25, 1958

INVENTOR
CHARLES M. KLINE
BY
Joseph Allen Brown
ATTORNEY

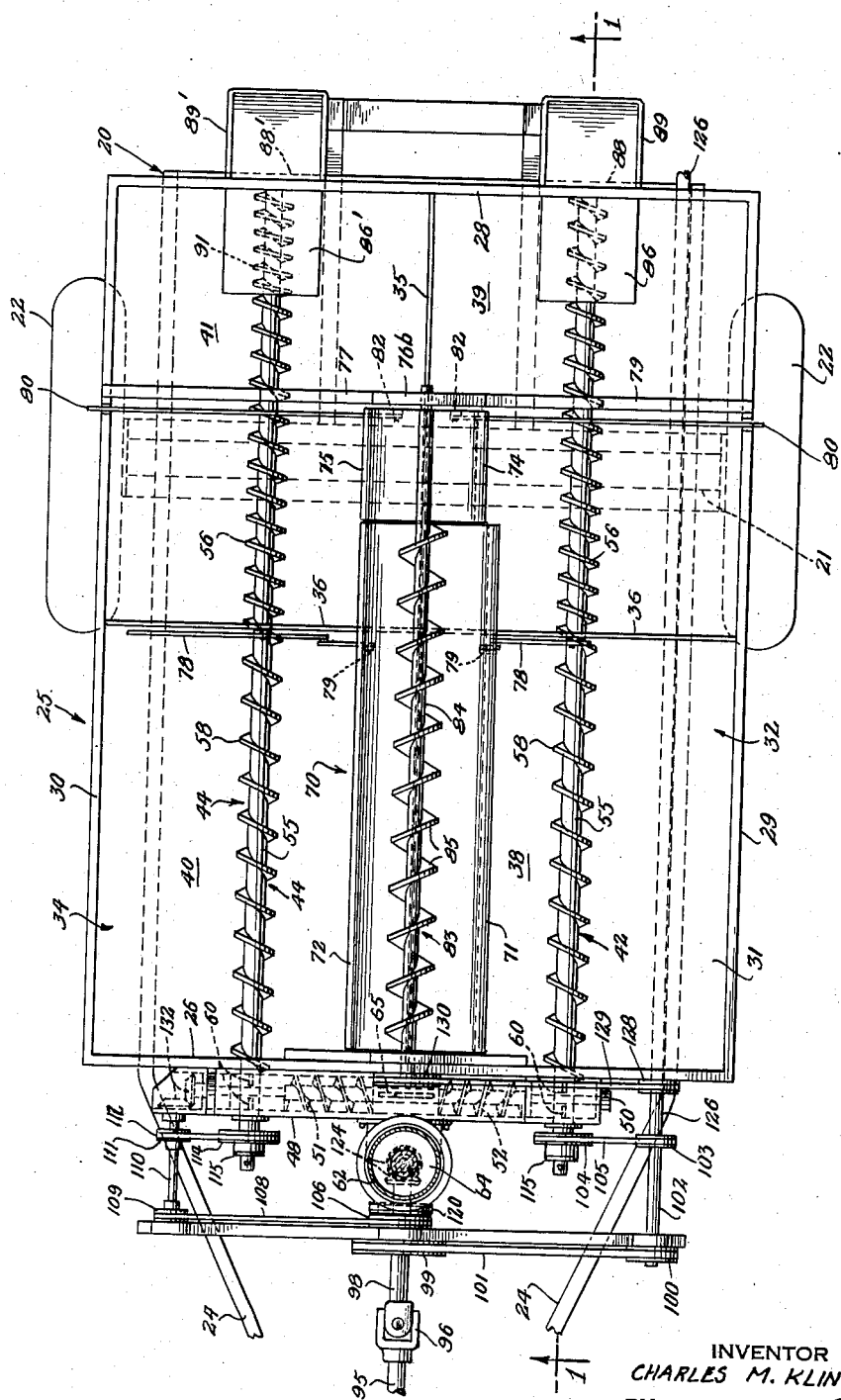

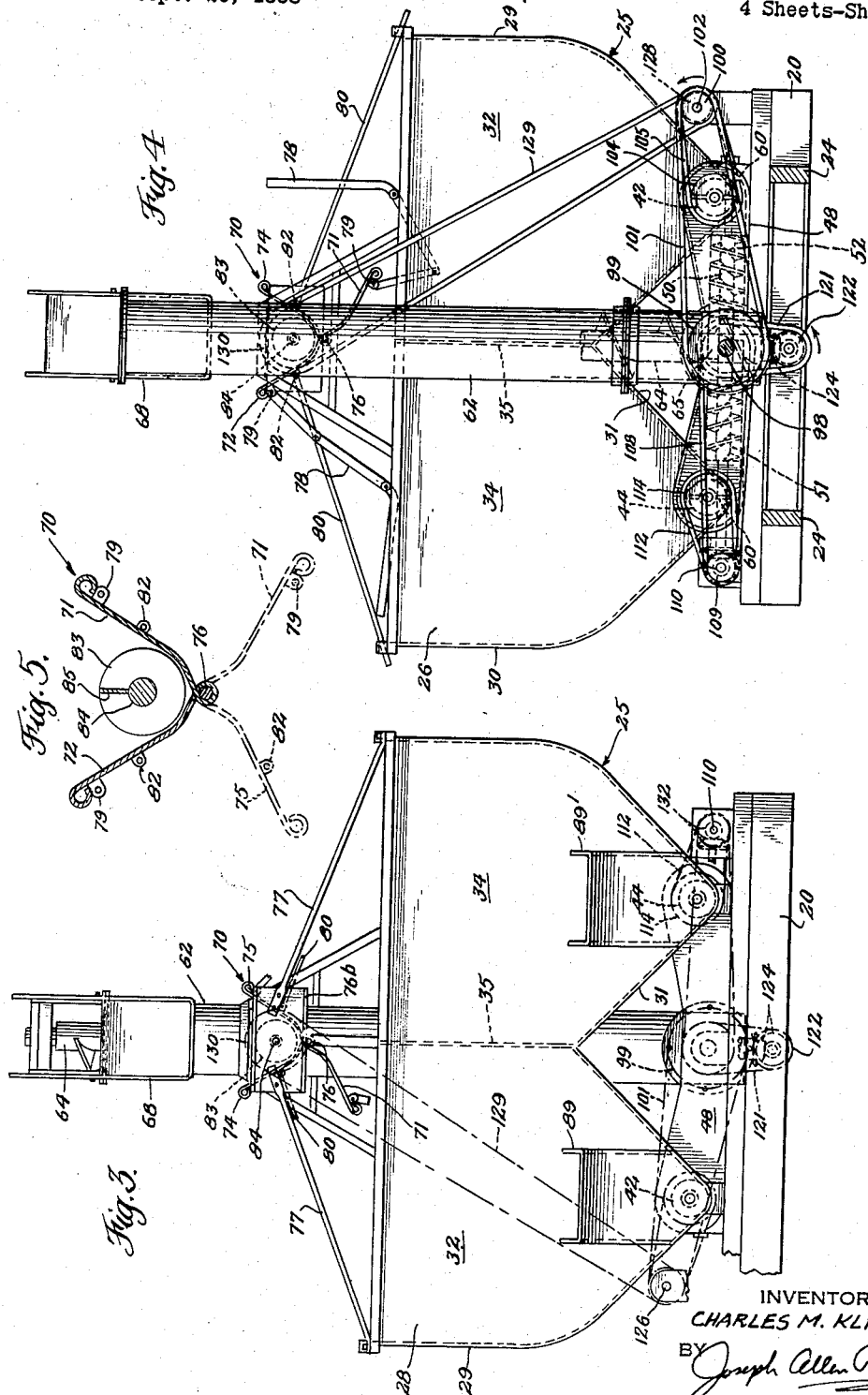

Sept. 20, 1960
C. M. KLINE
2,953,360
MIXER
Filed Sept. 25, 1958
4 Sheets-Sheet 4
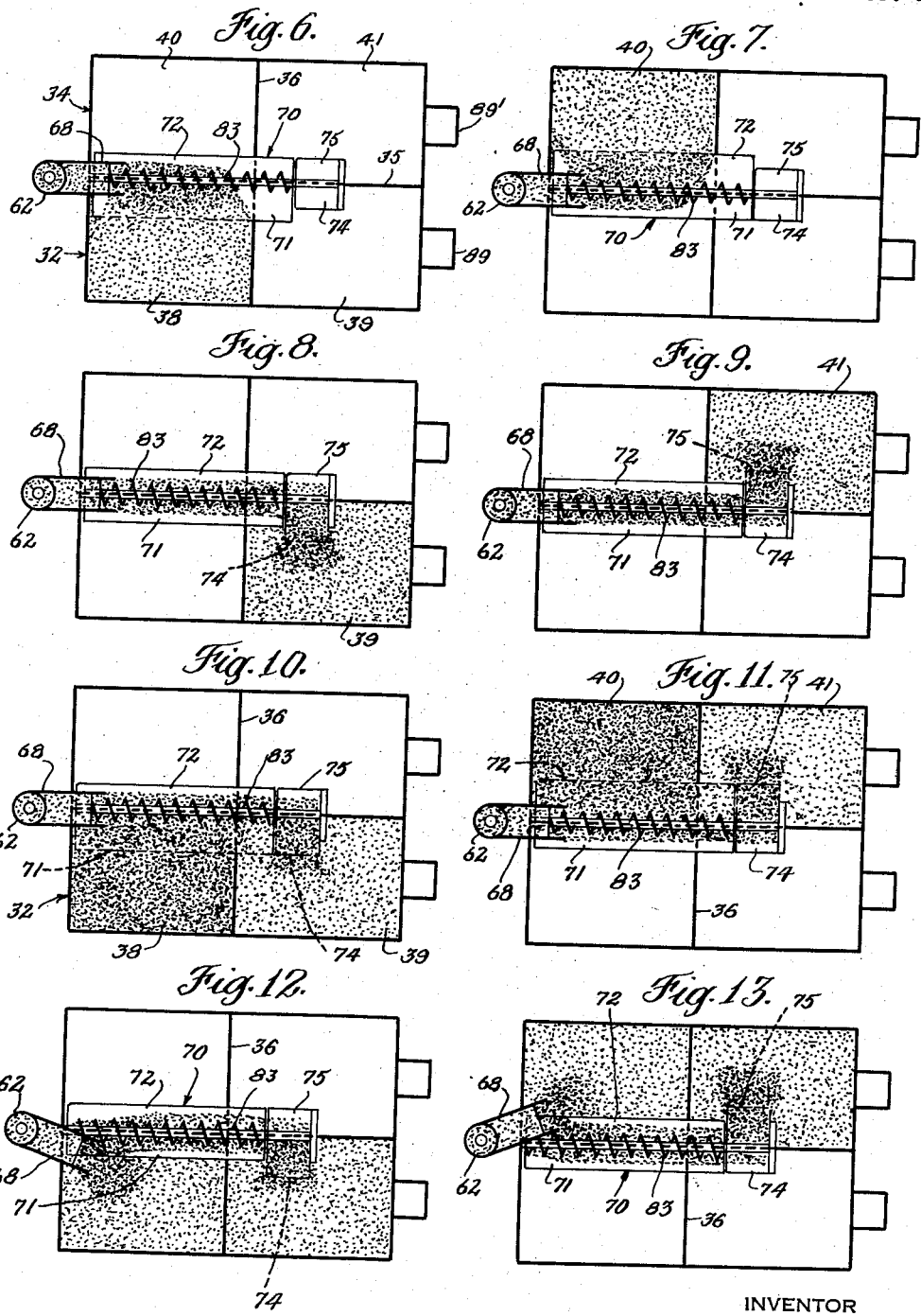
INVENTOR
CHARLES M. KLINE
BY Joseph Allen Brown
ATTORNEY

United States Patent Office 2,953,360
Patented Sept. 20, 1960

2,953,360
MIXER

Charles M. Kline, Joanna, Pa., assignor to Sperry Rand Corporation, New Holland, Pa., a corporation of Delaware Filed Sept. 25, 1958, Ser. No. 763,315

14 Claims. (Cl. 259—9)

The invention relates to transport apparatus for mixing fluent materials, particularly animal feeds.

Various transport mixing devices are presently provided for use on farms to mix feeds for animals. Such mixers can be used for mixing different types of feeds and, if desired, food supplements can be added. The end result sought is a thoroughly mixed combination feed ready for consumption. However, existing devices are generally limited in the manner in which they may be used and in the results which they can produce. Many are deficient in the uniformness of the mixing. Others are difficult to load and unload. Still others are poorly designed and difficult to operate.

An important object of this invention is to provide transport mixing apparatus which overcomes the above defects, providing a single feed mixing unit so designed and constructed that it may be used in a variety of ways according to the wishes of the operator.

Another object of this invention is to provide, in feed mixing apparatus, a feed screw operable to produce an intermixing of material conveyed by it and while the conveying is taking place.

Another object of this invention is to provide feed mixing apparatus which has separate compartments whereby different feed mixtures can be handled at one time, each feed mixture being subject, selectively, to further mixing and/or unloading.

A further object of this invention is to provide transport feed mixing apparatus provided with a compartment having two sections, there being means for discharging material into one or the other section, or for dividing the material whereby it may be simultaneously discharged into both sections.

A still further object of this invention is to provide feed mixing apparatus which, while capable of a wide variety of uses, is simply constructed enabling it to be manufactured, assembled and sold at moderate cost.

Other objects of this invention will be apparent hereinafter from the specification and from the recital in the appended claims.

In the drawings:

Fig. 2 is a section taken on the line 2—2 of Fig. 1, looking in the direction of the arrows, and showing the apparatus in plan;

Fig. 3 is an end view looking from right to left in Fig. 1;

Fig. 4 is a section taken on the line 4—4 of Fig. 1, looking in the direction of the arrows, and showing the apparatus from the forward end thereof;

Fig. 5 is a transverse section, on an enlarged scale, showing the trough at the top of the apparatus, the gates forming the trough being shown in one position in solid lines and in another position in dotted lines; and Figs. 6–13 are diagrammatic plan views illustrating the manner in which the apparatus may be used.

Figure 1:
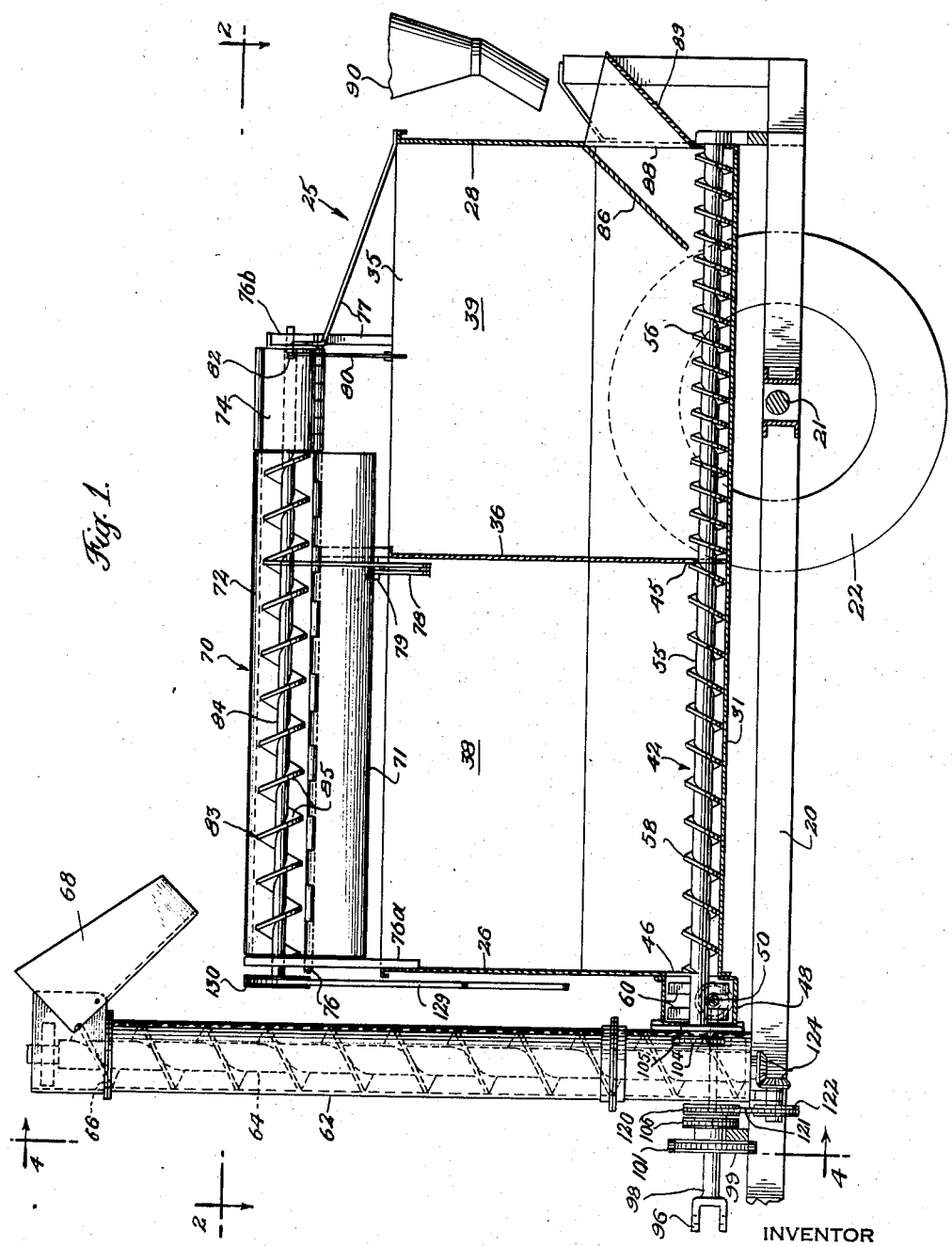
Fig. 1 is a longitudinal vertical section taken on the line 1—1 of Fig. 2 and showing transport mixing apparatus constructed according to this invention, a horizontal trough at the top of the apparatus being shown with one gate open.

Referring now to the drawings by numerals of reference, 20 denotes a longitudinally extending vehicle chassis having a transverse axle 21 supported from the ground by ground wheels 22 at the respective ends of the axle. The forward end of frame 20 has converging members 24 which support hitch means, not shown, for connection to the drawbar of a tractor or other power vehicle.

Mounted on frame 20 is a hopper 25 which is generally rectangular in shape when viewed in plan, Fig. 2. Hopper 25 has a front wall 26, a rear wall 28, side walls 29 and 30 and a W-shaped bottom 31. Hopper 25 is divided into two compartments 32 and 34 by a longitudinal, vertical partition 35 midway between the two side walls of the hopper and intersecting the center of the W-shaped bottom. The hopper also has a transverse partition 36 which divides each compartment into a forward section and a rear section. The forward and rear sections of compartment 32 are denoted 38 and 39, respectively, while the forward and rear sections of compartment 34 are denoted 40 and 41, respectively.

Each compartment has a longitudinally extending V-shaped bottom. Rotatable in the bottom of compartment 32 is a feed screw 42 and in the bottom of compartment 34, a feed screw 44. Each feed screw extends from the rear wall 28 to the front wall 26. Suitable openings 45 are provided in partition 36 for the respective screws. The rear end of each feed screw is supported on rear wall 28 while the forward end of each screw projects through a discharge outlet 46 (Fig. 1) and into a transversely extending housing 48. Rotatable in housing 48 is a transverse auger 50 having helical flight sections 51 and 52 oppositely wound and operable to deliver material to the center of housing 48.

As can be readily seen from Figs. 1 and 2, the longitudinal feed screws are of uniform diameter throughout. Each comprises a shaft 55 having one set of helical flights 56 in the rear sections of the compartments and different flights 58 in the front sections of the compartments. Specifically, the sections of the feed screws in compartment sections 38 and 40 have helical flights of a standard pitch. However, the flights on the portions of the feed screws in the rear sections 39 and 41 of the respective compartments have flights with a two-thirds pitch. The feed screws are adapted to be rotated so that they deliver material toward the front wall 26. The difference in pitch between the sections of the feed screws provides that the front sections of the feed screws are capable of picking up more material than the rear sections of the feed screws. Thus, when the feed screws are rotated, they will pick up material from the rearward sections of the compartments, deliver the material through the openings 45 and into the forward sections of the compartments whereupon the different flights will cause material to be picked up from the forward sections, added to material already being conveyed and the sum total discharged through the outlets 46.

Each feed screw has a shaft portion which projects forwardly of front wall 26. Such portion carries radially extending paddles 60 adapted to direct material as it comes off the screws into the flights 51 and 52 of transverse auger 50.

Communicating with the central section of transverse housing 48 is a vertically extending, tubular housing 62 in which an auger 64 is rotatable. The transverse auger 50 has longitudinally extending deflectors 65 (Fig. 2) which discharge material from the transverse auger and into the bottom of housing 62. The auger 64 then elevates the material to an opening 66 at the top of the housing. Mounted on housing 62 to swivel about the axis of auger 64 is a discharge spout 68 which extends downwardly and outwardly.

Normally, spout 68 discharges material into a longitudinally extending trough 70 disposed on top of hopper 25 along longitudinal partition 35. Trough 70 is made up of four gates, namely forward gates 71 and 72 and rear gates 74 and 75. The forward gates extend from adjacent the front wall 26 rearwardly and past transverse partition 36, terminating shortly after passing the transverse partition. The rear gates 74 and 75 are of short length covering only a portion of the space from the ends of gates 71 and 72 and the rear wall 28. The gates are normally disposed as shown in solid lines, Fig. 5. The respective gates are hinged to a longitudinal shaft 76 supported at its forward end on plate 76a connected to front wall 26 and at its rear end on plate 76b carried on struts 77. Gates 71 and 72 are swung downwardly or upwardly by means of control arms 78 pivotally supported on transverse partition 36. Each control arm comprises a plurality of links disposed as shown and pivotally connected to ears 79 on gates 71 and 72. The rear gates 74 and 75 are swung up or down by means of pull rods 80 connected to the gates through tabs 82.

Rotatable in the trough 70 is an auger 83 having a shaft 84 and flights 85. Shaft 84 extends from plate 76a, over the partition 36 to plate 76b. The auger flights 85 are provided only on the portion of shaft 84 extending through gates 71 and 72, the portion of the shaft extending through gates 74 and 75 being flightless. Auger 85 is adapted to convey material deposited in the trough 70 rearwardly.

Covering a portion of the rearward section of feed screws 42—44 are downwardly and forwardly inclined shields 86—86'. These shields guard openings 88—88' in rear wall 28 communicating with the respective feed screws. Each opening is provided with a chute 89—89' into which material can be dumped to feed into the hopper 25. Preferably, the chute 89 connected to compartment 32 is adapted to receive ground feed from a hammermill spout 90 or the like. The chute 89' communicating with compartment 34 is adapted to have food supplements or the like dumped into it. As shown in Fig. 2, the rearward section of feed screw 44 under shield 86' has flights 91 of a shorter pitch than the flights on the portion 56 of the screw in compartment 41 whereby supplements dumped into the compartment 34 will be gradually and slowly fed into the feed screw for movement through sections 40 and 41.

The apparatus is adapted to be driven from a source of power such as the power-take-off shaft of the tractor which transports the mixing apparatus. A power-take-off drive is provided including a shaft 95 universally connected at 96 to a power imput shaft 98. Shaft 98 has a sprocket 99 which drives to a sprocket 100 through an endless belt 101. Sprocket 100 drives a shaft 102 having a sheave 103 keyed to it. Sheave 103 is connected to a sheave 104 on the shaft 55 of feed screw 42 through an endless belt 105. Input shaft 98 also drives a sheave 106 connected through endless belt 108, sheave 109, shaft 110, sheave 111, endless belt 112 and sheave 114 to the shaft of feed screw 44. Suitable, identical, manually operable clutches 115 are provided for connecting and disconnecting the drive through the respective feed screws.

Input shaft 98 drives the vertical auger 64 through sheave 120, endless belt 121, sheave 122, and beveled gearing 124.

The top auger 83 is driven from the drive to feed screw 42. The shaft 102 has extension 126 which runs all the way to the rear end of the apparatus. Mounted on shaft 126 is a sheave 128 which drives through endless belt 129 to a sheave 130 connected to the shaft 84 of auger 83. The drive to the respective augers and feed screws is such that the feed screws rotate to delievr material toward the front wall 26, the vertical auger rotates to elevate material, and the top horizontal auger rotates to deliver material rearwardly.

In addition to the above drives, a drive in the form of bevel gearing 132 (Fig. 2) is provided between shaft 110 and transverse auger 50.

*Operation*

To load hopper 25, material is introduced into compartment 32 through opening 88 in the rear wall 28. Material is received from any suitable source such as the outlet 90 from a hammermill. As the feed enters compartment 32, feed screw 42 conveys it through the section 39, opening 45, section 38 and then through the opening 46 to the transverse auger 50. Transverse auger 50 conveys the material to the vertical auger housing 62 where the auger 64 picks up the material and elevates it to the discharge spout 68. When the discharge spout is positioned as shown in Fig. 1, it will discharge material into the center of trough 70. The top auger 83 will convey the material rearwardly in the trough, such material being discharged selectively into one of the four hopper sections.

As shown in Fig. 6, gate 71 can be opened while gates 72, 74 and 75 are kept closed. As the material comes from the spout 68, it will be deposited in section 38 of compartment 32. If desired, the material can be discharged into section 40 as shown in Fig. 7, by opening gate 72 and closing gates 71, 74 and 75. To deposit material into section 39 as shown in Fig. 8, gate 74 is opened and gates 71, 72 and 75 closed. Material is deposited into section 41 as shown in Fig. 9 by opening gate 75 and closing gates 71, 72 and 74.

Preferably, when the hopper is first loaded, the material is discharged into section 41 as shown in Fig. 9. Once section 41 is filled with a substantial amount of material, food supplements can be gradually introduced through the opening 89' in the rear wall 28. The supplement will be picked up by the portion 91 of feed screw 44 and slowly fed into the material in section 41. A mixture of the material and supplement will then be moved through partition 36 to section 40 and then to the vertical auger 64 for recirculation back into the hopper. The apparatus can be operated as desired and the material circulated and recirculated until all four sections of the hopper are full, containing completely mixed material, including food supplements.

If desired, when a half load of material is to be placed in hopper 25, all the material can be deposited in one compartment only, such as compartment 32, Fig. 10. This is done by first closing gates 72 and 75 and opening gates 71 and 74. The material is fed into the hopper through one of the inlet chutes. The associated feed screw conveys the material to the vertical auger 64. As the material comes from discharge spout 68, it will be deposited into section 38. Once section 38 is filled, the auger will move the material from the top of section 38 across the partition 36 and begin filling section 39.

If we assume that sections 38 and 39 are filled with dairy feed, for example, and it is desired to mix them further, and also to add food supplements, the apparatus can be used to convey the material through the vertical auger and then to sections 40 and 41, Fig. 11. The section 40 is filled first and when it is filled to the top, the auger 83 will convey the material over partition 36 to the rear section 41. Once both compartments are filled, food supplements can be added and then the material in both sections recirculated until a thoroughly mixed mass is produced.

While two sections of one compartment can be filled by filling the front section and then when it is filled up conveying the material over the transverse partition and into the rear section, it is possible to fill both sections at the same time. This is done as shown in Figs. 12 and 13. The two front gates 71 and 72 are kept closed and gate 74 or 75 opened. The discharge spout 68 is pivoted either right or left, as the case may be, whereby a portion of the material delivered from the discharge spout will be delivered into trough 70 while another portion will be delivered into the forward section of the compartment. In other words, the discharged material is split, part of it going into the forward section and part going into the trough for conveyance through the trough to the rearward section.

Because of the difference in pitch of the flights on the forward and rear sections of each feed screw, when the feed screws are operated, material is picked up from both the forward and rearward sections of each compartment and conveyed to the transverse auger. The paddles 60 provide a positive means for bridging the material from the feed screws to the transverse auger. The deflectors 65 on the center portion of the transverse auger provide a means for directing the material to the vertical auger. The swivel mounting of the discharge spout 68 at the top of the housing 62 makes it possible to use the device in various ways and selectively discharge the material as desired.

Since a horizontal trough and top auger are used, the height of the vertical auger need not be great, as is the case when a discharge spout is employed which is long enough to direct material into a forward or rear compartment.

As shown in Fig. 2 the section 126 of shaft 102 extends all the way to the rear of the mixer where it can be used to supply power to the hammermill or other apparatus employed.

With the structure described it is possible to mix feed in one compartment without disturbing material in the other compartment. As a result, if desired, one compartment can be filled with one feed, such as dairy feed, and the other with another feed, such as chicken feed. Preferably when two feeds are to be handled by the mixer and kept separate, the first feed is mixed, including supplements, and then deposited in compartment 32. Then, the clutch 115 to feed screw 42 is disconnected and the second feed is delivered through chute 89' to compartment 34. Such feed is thoroughly mixed by circulation and re-circulation until sufficient mixing has been achieved and compartment 34 filled. Thereafter either compartment can be unloaded according to the wishes of the operator through manipulation of the clutches 115. For unloading, spout 68 is swiveled to discharge away from the hopper. As is conventional, the vertical housing 62 may be provided with means whereby the housing and spout can be pivoted downwardly to bring the spout close to the ground or to a receptacle for the feed.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. Transport apparatus for mixing fluent materials comprising a hopper having a forward wall, a rear wall, a longitudinal partition dividing the hopper into two compartments, and a transverse partition dividing each compartment into a forward section and a rear section, a pair of rotatable feed screws, one in the bottom of each compartment and extending through both sections thereof from said rear wall, through said transverse partition and to said front wall, said front wall having a pair of discharge outlets communicating with said feed screws for receiving material therefrom, said transverse partition having an opening for each of said feed screws, the feed screw in each compartment including a shaft having helical flights, the flights in each rear section having a lesser pitch than the flights in each forward section whereby material may be simultaneously removed from both sections of each compartment, intermixed and discharged through said discharge outlets, a trough at the top of said hopper extending generally horizontally along said longitudinal partition and over said transverse partition, means for receiving material delivered through said outlets and for elevating such material to said trough, means for conveying material in said trough, and means for discharging material therefrom into any selected section.

2. Transport apparatus as recited in claim 1 wherein a pair of inlet openings are provided in said rear wall for introducing material into the rear sections of the respective compartments.

3. Transport apparatus as recited in claim 2 wherein each of said inlet openings communicates with one of said pair of feed screws, a shield overlying a portion of the rear end of each of the feed screws, the portion of the feed screw under one of said shields, at least, having flights with a lesser pitch than the flights on the other portions of the feed screws.

4. Transport apparatus as recited in claim 1 wherein said means for receiving material delivered through said outlets comprises a transverse auger having a pair of spaced, oppositely wound sections each adapted to convey material toward a central section, a vertical auger for conveying material from said central section to said trough, a housing for said transverse auger, and a housing for said vertical auger.

5. Transport apparatus as recited in claim 4 wherein means is provided for directing material from said feed screws to said transverse auger, and means on said transverse auger for discharging material to said vertical auger.

6. Transport apparatus as recited in claim 4 wherein the shaft of each of said feed screws projects through its associated discharge outlet and has radial paddies affixed to it for directing material to said transverse auger.

7. Transport apparatus as recited in claim 4 wherein said transverse auger has a middle portion which carries longitudinally extending members for deflecting material delivered to said central section to said vertical auger.

8. Transport apparatus as recited in claim 4 wherein said vertical auger housing has an opening at its upper end, a spout receiving material from said opening, said spout being connected to said upper end for swivel movement about a vertical axis.

9. Transport apparatus as recited in claim 1 wherein said trough has a forward section which extends over the forward sections of said compartments and over part of the rear sections, and a rear section which extends over the rear sections of said compartments, said forward trough section being longer than said rearward trough sections.

10. Transport apparatus as recited in claim 9 wherein said forward and rear trough sections each comprise a pair of gates normally disposed generally in a V and hinged at their apex for swinging movement up or down.

11. Transport apparatus as recited in claim 10 wherein means is provided for opening said gates, selectively, by swinging them downwardly.

12. Transport apparatus as recited in claim 11 wherein said means for conveying material in said trough comprises an auger extending from adjacent said front wall, rearwardly and over said transverse partition, and terminating short of said rear wall.

13. Transport apparatus as recited in claim 12 wherein the length of the auger in said trough is substantially the same as the length of the forward pair of gates.

14. Transport apparatus as recited in claim 1 wherein there is a drive shaft, a first means for connecting said drive shaft to one of said feed screws, a second means for connecting said drive shaft to the other of said feed screws, and each of said connecting means including clutch means whereby the drive to said feed screws can be disconnected.

References Cited in the file of this patent

UNITED STATES PATENTS

| | | |
|---|---|---|
| 304,615 | Church | Sept. 2, 1884 |
| 827,664 | Pumphrey | July 31, 1906 |
| 1,457,325 | Thatcher | June 5, 1923 |
| 2,003,417 | Andreas | June 4, 1935 |
| 2,101,490 | Bullock et al. | Dec. 7, 1937 |
| 2,625,001 | Heun | Jan. 13, 1953 |
| 2,767,963 | Ringen et al. | Oct. 23, 1956 |

FOREIGN PATENTS

| | | |
|---|---|---|
| 145,081 | Austria | Mar. 25, 1936 |
| 536,423 | Canada | Jan. 29, 1957 |